United States Patent
Foster et al.

(10) Patent No.: US 6,919,052 B2
(45) Date of Patent: Jul. 19, 2005

(54) CATALYTIC CONVERTER

(75) Inventors: Michael Ralph Foster, Columbiaville, MI (US); Paul E. Jankowski, Goodrich, MI (US)

(73) Assignee: Delphi Technologies, Inc., Troy, MI (US)

( * ) Notice: Subject to any disclaimer, the term of this patent is extended or adjusted under 35 U.S.C. 154(b) by 681 days.

(21) Appl. No.: 09/729,907

(22) Filed: Dec. 4, 2000

(65) Prior Publication Data

US 2002/0068025 A1 Jun. 6, 2002

(51) Int. Cl.$^7$ .............................. B01D 53/34; F01N 3/28
(52) U.S. Cl. ...................... 422/179; 422/177; 422/180
(58) Field of Search ................................ 422/171, 179, 422/177, 180

(56) References Cited

U.S. PATENT DOCUMENTS

| | | | |
|---|---|---|---|
| 3,978,567 A | * | 9/1976 | Vroman ........................ 29/890 |
| 4,350,664 A | * | 9/1982 | Gaysert ........................ 422/179 |
| 4,865,818 A | * | 9/1989 | Merry et al. ................. 422/179 |
| 5,980,837 A | * | 11/1999 | Umin et al. ................. 422/179 |
| 6,159,430 A | | 12/2000 | Foster et al. |
| 6,338,827 B1 | | 1/2002 | Nelson |
| 6,354,903 B1 | | 3/2002 | Nelson |
| 6,361,821 B1 | | 3/2002 | Anderson et al. |
| 6,391,822 B1 | | 5/2002 | Dou et al. |
| 6,438,839 B1 | | 8/2002 | Hardesty et al. |
| 6,455,463 B1 | | 9/2002 | Labarge et al. |
| 6,464,945 B1 | | 10/2002 | Hemingway |
| 6,464,947 B2 | | 10/2002 | Balland |
| 6,497,847 B2 | | 12/2002 | Foster et al. |
| 6,532,659 B1 | | 3/2003 | DeSousa et al. |
| 6,591,497 B2 | | 7/2003 | Foster et al. |
| 6,605,259 B1 | | 8/2003 | Henry |
| 6,623,704 B1 | | 9/2003 | Roth |
| 6,624,113 B2 | | 9/2003 | Labarge et al. |
| 6,643,928 B2 | | 11/2003 | Hardesty et al. |

OTHER PUBLICATIONS

3M ™ Interam ™ Mat Products Designer's Guide, Sect. 4. Converter Design Guidelines, 3M May 1997, pp. 4–5 through 4–12.

* cited by examiner

*Primary Examiner*—Hien Tran
(74) *Attorney, Agent, or Firm*—Paul L. Marshall

(57) ABSTRACT

A catalytic converter comprises a catalyst substrate concentrically disposed in a shell and having a mat support material located concentrically in between the catalyst substrate and shell. The catalyst substrate includes structural features located on its outer surface that engage the mat support material. The shear forces exerted between the catalyst substrate and mat support material, in addition to the normally present frictional forces, reduce the axial movement of the catalyst substrate during assembly and operation of the catalytic converter.

12 Claims, 14 Drawing Sheets

CATALYTIC CONVERTER

TECHNICAL FIELD

The invention relates to catalytic converters for mobile vehicles and, more particularly, to an apparatus and method for reducing axial movement of a catalyst substrate in a catalytic converter.

BACKGROUND OF THE INVENTION

As is well known, the purification of exhaust gases from internal combustion engines, particularly in mobile vehicles, is generally achieved by a catalytic converter in which a ceramic or metallic element having a honeycomb cell structure, which is disposed in a gas-tight sheet metal shell, acts as a catalyst carrier. More precisely, this honeycomb cell structure or catalyst substrate is covered with a catalyst that contains a precious metal which functions, in the presence of a stoichiometric mixture of exhaust gases, to convert noxious or otherwise environmentally unfriendly components of the exhaust gas, such as hydrocarbons (HC), carbon monoxide (CO) and nitrogen oxides ($NO_x$), to carbon dioxide ($CO_2$), water ($H_2O$) and nitrogen (N).

A single sheet of rectangular shaped mat support material having a groove on one end and complimentary tongue on the other, or other combination of complimentary attachment features, is disposed between the catalyst substrate and shell. The sheet of mat support material is wrapped around the lateral (outer) peripheral surface of the ceramic or metallic element such that the tongue and groove engage. The wrapped catalyst substrate is then disposed within the gas-tight shell.

Currently, a uniformly compressed piece of the mat support material is used between the catalyst substrate's outer surface and the shell to prevent axial movement of the catalyst substrate. Axial movement is resisted by the product of the mat support material force, the coefficient of friction between the catalyst substrate and the mat support material, and/or the coefficient of friction between the mat support material and shell. However, when using catalyst substrates that have frangible walls, for fast warm-up and low flow restriction, the catalyst substrate tends to be too weak to resist the mat support material forces necessary to prevent axial movement.

Consequently, there exists a need to reduce the axial movement of a catalyst substrate during operation of a catalytic converter.

SUMMARY OF THE INVENTION

The drawbacks and disadvantages of the prior art are overcome by the catalytic converter of the exemplary embodiment of the present invention and its method of manufacture. A catalytic converter comprises a catalyst substrate comprising a catalyst and having one or more features on an outer surface. A shell, which includes an opening is concentrically disposed around the catalyst substrate. A mat support material is disposed between the catalyst substrate and shell, concentrically around the catalyst substrate. The feature of the catalyst substrate engages the mat support material to reduce the axial movement of the catalyst substrate. The catalyst substrate is concentrically disposed within the shell. The opening of the shell is secured using an end cone and/or an end plate.

The mat support material engages the feature on the catalyst substrate. The feature comprises a ridge and/or a plurality of ridges and/or a depression and/or a plurality of depressions. The ridge or plurality of ridges is concentrically and circumferentially disposed about the outer surface of the catalyst substrate. The diameters the ridge and/or plurality of ridges are equal to or less than the diameters of the first lip and second lip. The mat support material concentrically disposed around the catalyst substrate and engages the one or more features of the catalyst substrate. The engagement of the features, mat support material, and shell reduce the axial movement of the catalyst substrate during operation of the catalytic converter.

The above-described and other features and advantages of the present invention will be appreciated and understood by those skilled in the art from the following detailed description, drawings, and appended claims.

BRIEF DESCRIPTION OF THE DRAWINGS

For a further understanding of the nature of the present invention, as well as other features and advantages thereof, reference should be made to the following detailed description taken in conjunction with the accompanying drawings, which are meant to be exemplary, not limiting, and wherein like elements are numbered alike in the several figures.

DESCRIPTION OF THE PREFERRED EMBODIMENT

Figure 1:
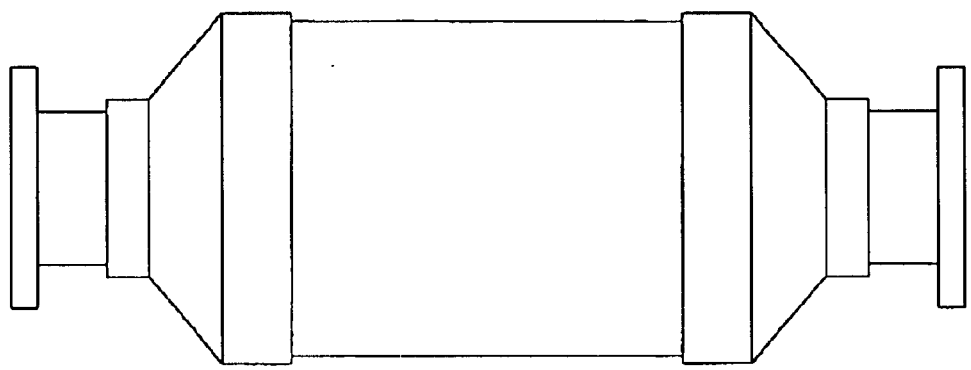
FIG. 1 is a typical catalytic converter design of the prior art.

An internally insulated catalytic converter for use in a mobile vehicle comprises a catalyst substrate comprising a catalyst. The catalyst substrate can be concentrically disposed within a shell having an opening. A mat support material can be disposed concentrically between the catalyst substrate and the shell, around the catalyst substrate. An end cone, end plate, exhaust manifold, or the like, can secure the opening of the shell.

A non-internally insulated catalytic converter for use in a mobile vehicle comprises a catalyst substrate concentrically disposed within a shell. The shell can include an gas exhaust intake area, a gas exhaust outlet area, and a containment area disposed therebetween. The containment area can optionally be defined by a first shoulder concentrically disposed between the containment area and exhaust gas intake area, and by a second shoulder concentrically disposed between the containment area and the exhaust gas outlet area.

The catalyst substrate can include an outer surface having structural features such as a first lip, a second lip, and a substantially, uniform depressed area disposed therebetween. Alternatively, the structural features can include a concentric first lip, a concentric second lip, and a continuous annular ridge or series of alternating continuous annular ridges and depressions concentrically and circumferentially disposed around the catalyst substrate, between the first and second lip. The structural features can be formed during or after extrusion of the catalyst substrate.

The catalyst substrate can comprise any material designed for use in a spark ignition or diesel engine environment and have the following characteristics: (1) capable of operating at temperatures up to about 1,000° C.; (2) capable of withstanding exposure to hydrocarbons, nitrogen oxides, carbon monoxide, carbon dioxide, and/or sulfur; and (3) having sufficient surface area and structural integrity to support the desired catalyst. Some possible materials include cordierite, silicon carbide, metallic foils, alumina sponges, porous glasses, and the like, and mixtures comprising at least one of the foregoing. Some ceramic materials include "HONEY CERAM", commercially available from NGK-Locke, Inc, Southfield, Mich., and "CELCOR", commercially available from Corning, Inc., Corning, N.Y.

Although the catalyst substrate can have any size or geometry, the size and geometry are preferably chosen to optimize the surface area in the given converter design parameters. Typically, the catalyst substrate has a honeycomb geometry, with the combs being any multi-sided or rounded shape, with substantially square, hexagonal, octagonal or similar geometries preferred due to the ease of manufacturing and increased surface area. Furthermore, the catalyst substrate can comprise various overall, rounded or multi-sided cross-sectional geometries such as round, elliptical, hexagonal, octagonal, and the like. More specifically, the catalyst substrate can have various geometries with surface features as illustrated by a catalyst substrate 10, 30, and a catalyst substrate 50 in FIGS. 3, 5, and 7. These catalyst substrates have various peaks and valley surface features disposed about the periphery thereof.

Meanwhile, disposed on and/or throughout catalyst substrates 10, 30, 50 is a catalyst for converting exhaust gases to acceptable emission levels as is known in the art. The catalyst material can be applied over the entire surface area or selected portions depending upon the several factors, including the structure of the lip, catalyst's properties, cost, catalyzing reaction conditions, gas passageway flow conditions, and the like. The catalyst may comprise one or more catalyst materials that are wash coated, imbibed, impregnated, physisorbed, chemisorbed, precipitated, or otherwise applied to the catalyst substrate. Possible catalyst materials include noble metals, such as platinum, palladium, rhodium, iridium, osmium and ruthenium; other metals, such as tantalum, zirconium, yttrium, cerium, nickel, copper, and the like; metal oxides; and mixtures and alloys comprising at least one of the foregoing, and other conventional catalysts.

Figure 3:
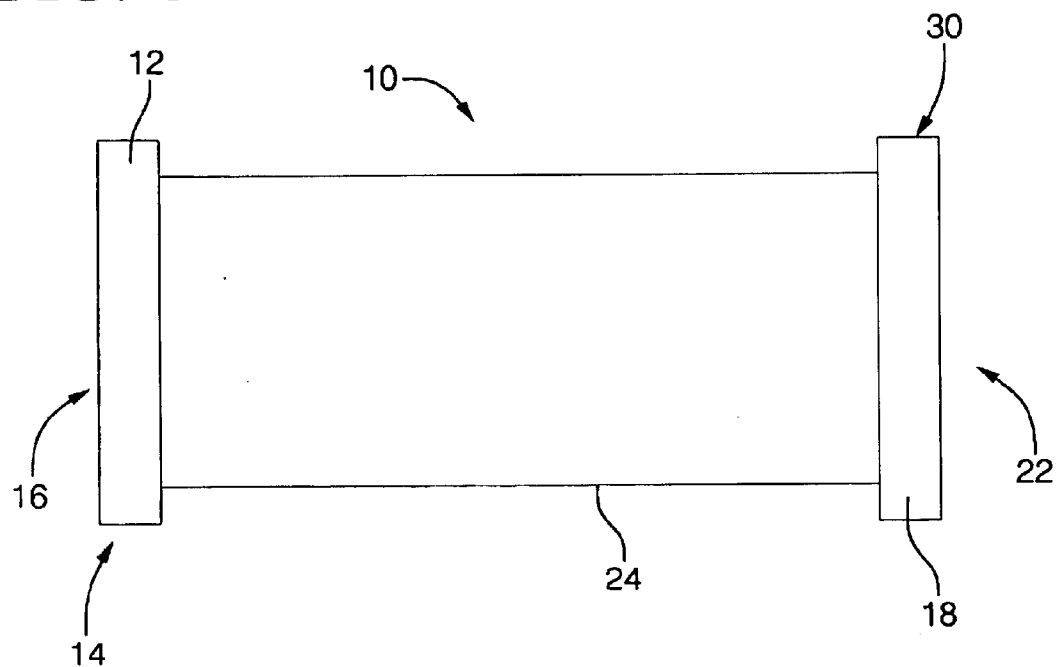
FIG. 3 is a side view of an exemplary embodiment of a catalyst substrate of the present invention.
Figure 4:
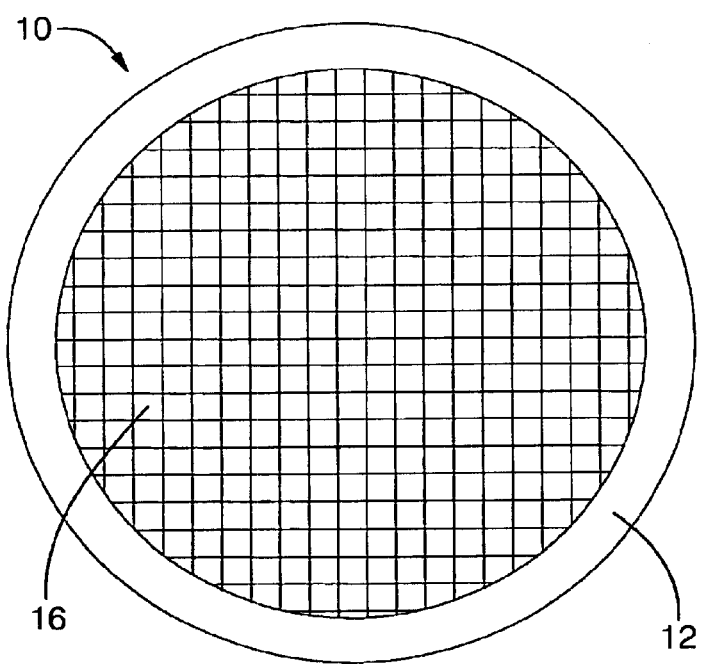
FIG. 4 is an end view of the catalyst substrate of FIG. 3.

Referring now to the exemplary embodiments shown in FIGS. 3 and 4, catalyst substrate 10 can preferably include both a concentric first lip 12 located concentrically about a first end 14 of catalyst substrate 10, surrounding an exhaust gas inlet 16, and a concentric second lip 18 located concentrically about a second end 20 of catalyst substrate 10 and surrounding an exhaust gas outlet 22. Catalyst substrate 10 can also preferably include a depressed outer surface 24 having a diameter smaller than the diameters of first lip 12 or second lip 18, and disposed between first lip 12 and second lip 18.

First lip 12 and second lip 18 do not necessarily form borders around their respective exhaust gas inlet 16 and exhaust gas outlet 22, as shown in FIG. 4. Both first lip 12 and second lip 18 can preferably be continuous annular lips, or, alternatively, segmented annular lips like segmented first lip 12'(See FIG. 25), which can also include a segmented second lip (not shown). In either embodiment, both first lip 12, 12' and second lip 18, can abut the outermost edges of the mat support material which is concentrically disposed within the depressed outer surface 24. Although a continuous annular lip is preferred, the segmented lips 12', can provide an adequate contact point for the mat support material to abut against and remain stationary. In addition, both first lips 12, 12' and second lips 18 can be expanded radially outward until reaching the point where the catalyst substrate 10 makes contact with the interior surface of the shell. However, an annulus (i.e., a space between the shell and the catalyst substrate) is preferably present to inhibit contact between the shell and the catalyst substrate which can cause the catalyst substrate damage. The annulus is preferably sufficiently wide to prevent contact between the catalyst substrate and the shell. Typically, the annulus can be approximately about one millimeter or less with about 1 mm to about 6 mm typically preferred.

The mat support material, which engages the catalyst substrate so as to prevent axial movement thereof during assembly and/or operation of the catalytic converter, is disposed in depressed outer surface 24 and inhibited from dislocating by lips 12, 18. The mat support material can span a portion of depressed outer surface 24, or can span all of outer surface 24 such that the outermost edges of the mat support material engage lips 12 and 18. The engagement of the mat support material between lips 12, 18, and structural feature(s) 31, helps prevent axial movement of the catalyst substrate 30 by supplementing the frictional forces with a compressive force against the ends of the mat support material 70.

Figure 5:
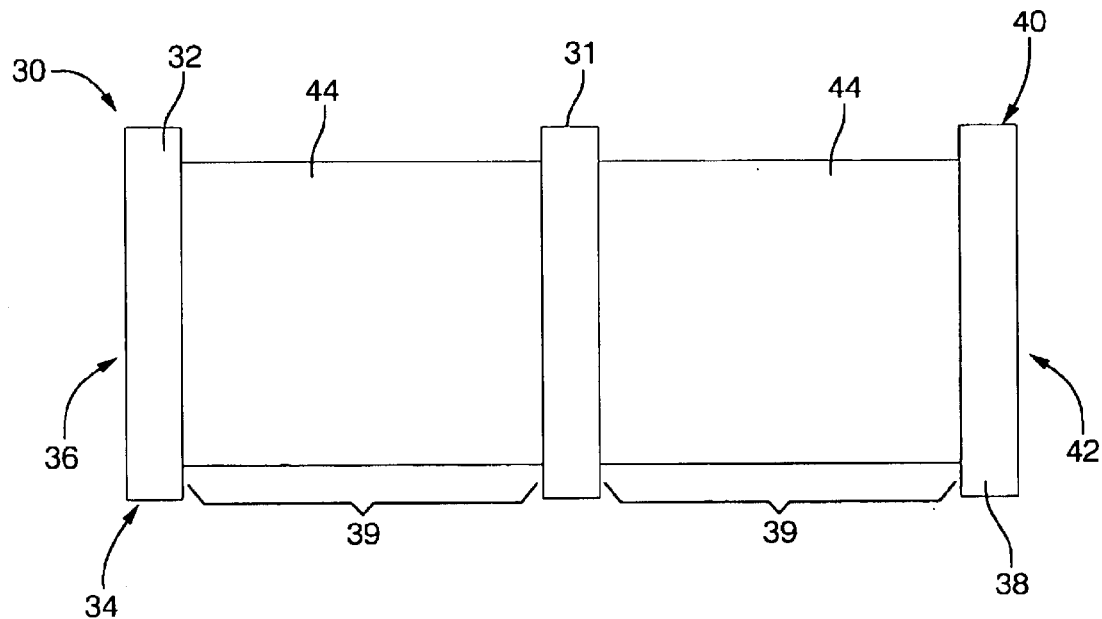
FIG. 5 is a side view of another exemplary embodiment of a catalyst substrate of the present invention.
Figure 6:
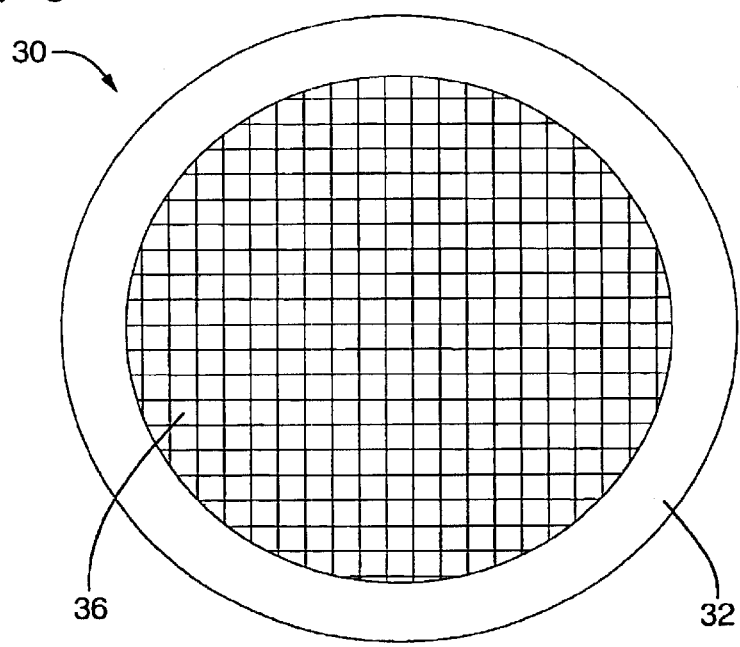
FIG. 6 is an end view of the catalyst substrate of FIG. 5.
Figure 25:
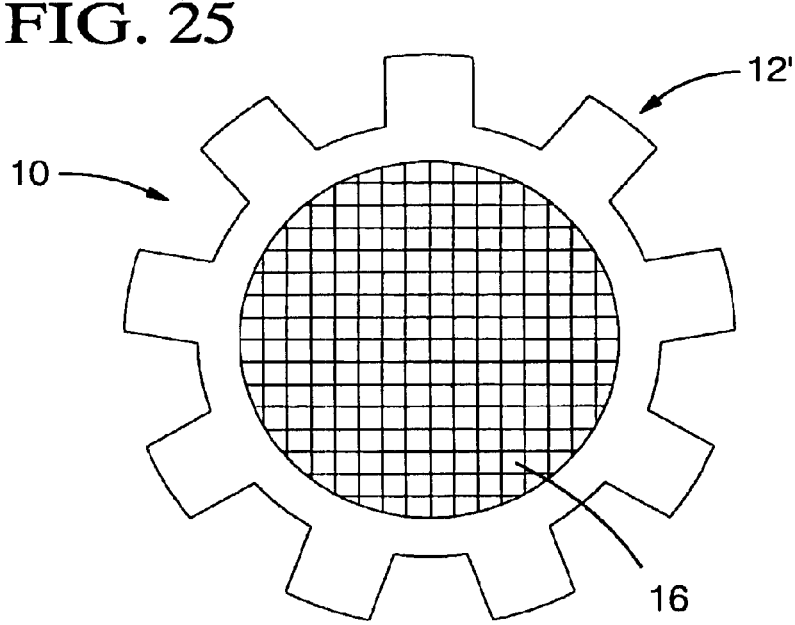
FIG. 25 is an alternative embodiment of the catalyst substrate of the present invention shown in FIG. 4.
Figure 26:
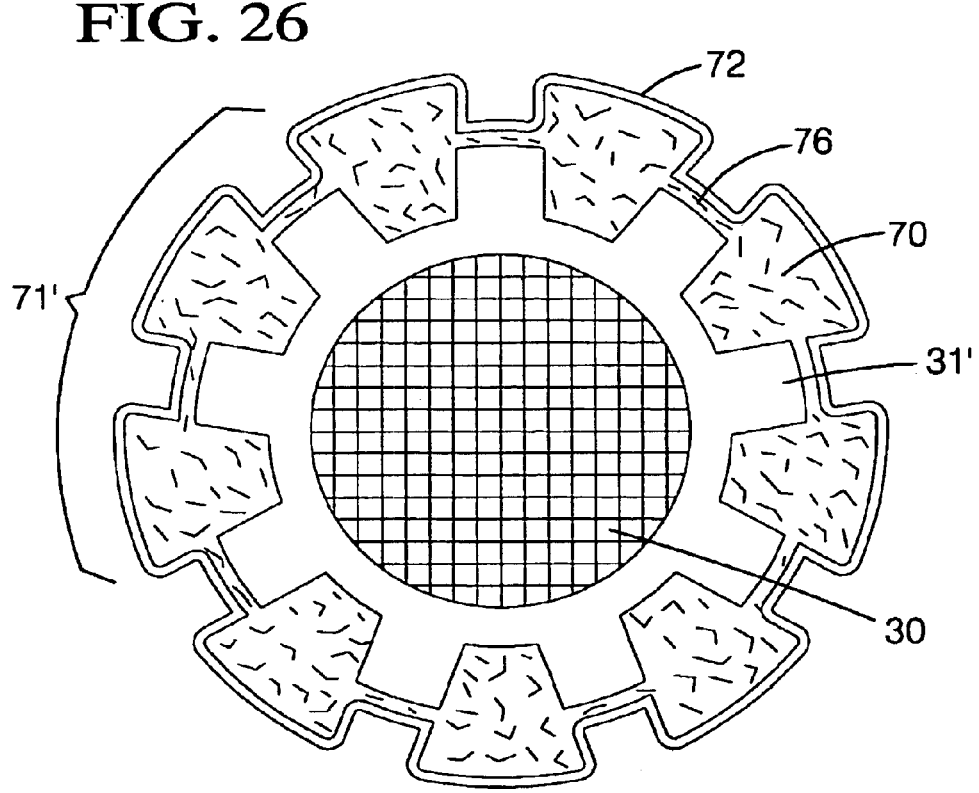
FIG. 26 is a cross-sectional view taken along lines 26—26 of an alternative embodiment of the catalytic converter of the present invention shown in FIG. 15.

As illustrated in FIGS. 5 and 6, catalyst substrate 30 can preferably include both a first lip 32 located concentrically about a first end 34 of catalyst substrate 30, surrounding exhaust gas inlet 36, and a second lip 38 located concentrically about a second end 40 of catalyst substrate 30 and surrounding exhaust gas outlet 42. Catalyst substrate 30 can also preferably include an outer surface 44 having a diameter smaller than the diameters of first lip 32 or second lip 38, and disposed therebetween. Outer surface 44 of catalyst substrate 30 can preferably comprise an area having a single structural feature (e.g., protrusion, rib, ridge, or the like), 31 disposed concentrically and circumferentially thereabout and a depression 39 flanking each side of ridge 31. First lip 32, second lip 38, and structural feature 31 can be continuous, or, as depicted in FIGS. 25 and 26, can be a segmented structural feature(s) 31'. First lip 32 and second lip 38, as opposed to first lip 12 and second lip 18 (See FIG. 4), can form borders around their respective exhaust gas inlet 36 and exhaust gas outlet 42.

Generally, the structural features 31, 31' can have a height h up to or exceeding the height h' of the lips 12, 18. (See FIG. 5.) It is preferred that the structural features 31, 31' not exceed the height h' to ensure proper engagement of the catalyst substrate within the shell, protection of the mat support material by lip 12, 12', and prevention of axial movement of the catalyst substrate during assembly and use of the catalytic converter. Typically the structural features and lips have a height of up to about 2 inches with a height up to 1 inch preferred, and a height of less than 0.5 inches especially preferred. With respect to width, the width of structural features 31, 31' (or combined width if multiple structural features, e.g., ribs, are employed (see FIG. 7)), is based upon the desired amount of mat support material for the given application. Although the mat support material could be disposed over the structural features 31, 31', it is preferably disposed between adjacent structural features and between the structural feature(s) and the lip(s). Consequently, as the width of the structural feature(s) increases, the amount of mat support material decreases. Typically, widths up to or exceeding about 2 inches can be employed, with a width up to about 1 inch preferred, and a width up to about 0.5 inches especially preferred.

Figure 27:
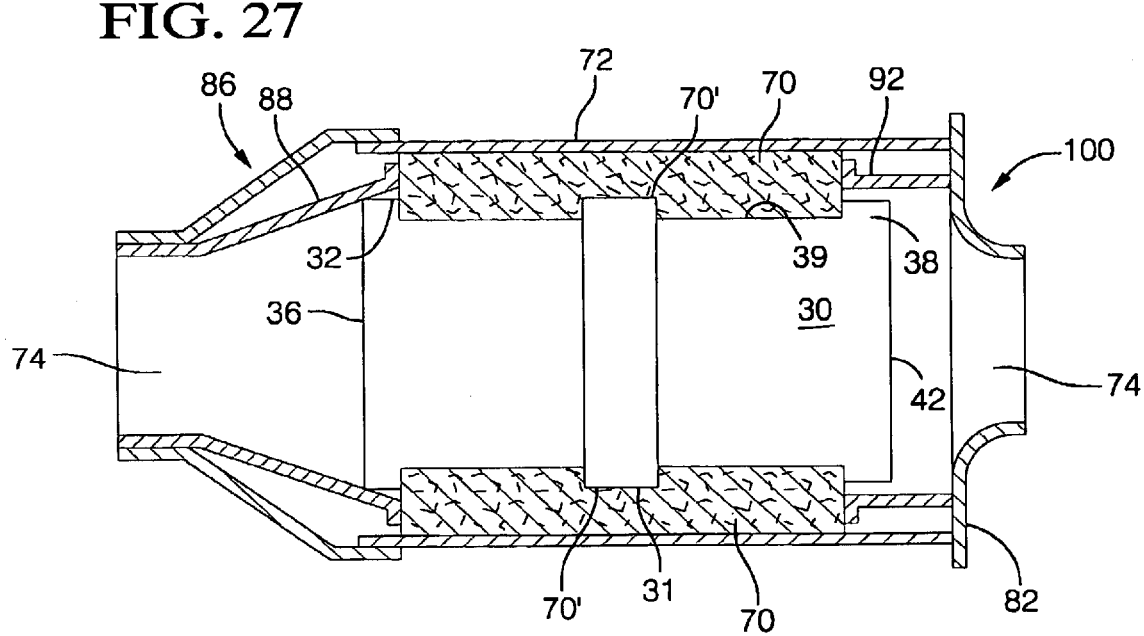
FIG. 27 is a cross-sectional view of the internally insulated catalytic converter of FIG. 10 utilizing an exemplary embodiment of a mat support material having a depressed surface.

When the mat support material is disposed between various features, it has a substantially uniform mount density. In contrast, when the mat support material is disposed over a structural feature of a catalyst substrate, the mat support material can have a greater mount density in the area over the structural feature. Consequently, the mat support material mount density can optionally be reduced to a desired mount density, e.g. a mount density similar to the area of the mat support material disposed between the features, by removing portions of mat support material to create a depressed surface 70'. (See FIG. 27) As shown in FIG. 27, the mat support material depressed surface 70' can be disposed over, and substantially align and coincide with, the structural feature so that the mat support material mount density remains substantially uniform.

Formation of the lip(s) and/or other structural feature(s) can be accomplished in various fashions. For example, it can be accomplished after extruding the catalyst substrate where the soft extrudite is "squeezed" to reduce the diameter of catalyst substrate 30 and create structural feature(s) and/or lip(s) concentrically and circumferentially about outer surface. Alternatively, first lip 32, second lip 38, and structural feature 31 can be formed with a ceramic material such as a ceramic paste, applied concentrically and circumferentially about exhaust gas inlet, exhaust gas outlet and/or outer surface.

Another alternative method for forming structural feature 31 and/or first and second lips 32, 38 comprises removing portions of ceramic material from the outer surface 44, preferably in a uniform, concentric manner, to form depressions 39 disposed between first lip 32 and structural feature 31, and likewise, between structural feature 31 and second lip 38. If desired, the resulting rough cellular periphery can be filled with a ceramic paste to create a smooth outer surface 44, or can remain rough to increase the coefficient of friction between the mat support material and the catalyst substrate.

Figure 7:
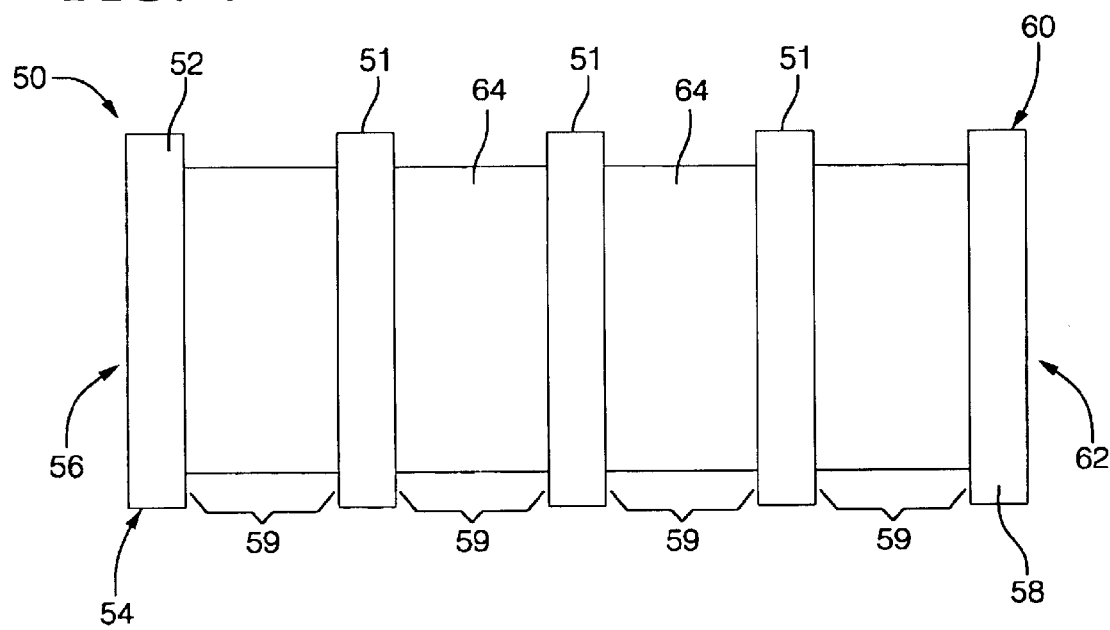
FIG. 7 is a side view of yet another exemplary embodiment of a catalyst substrate of the present invention.
Figure 8:
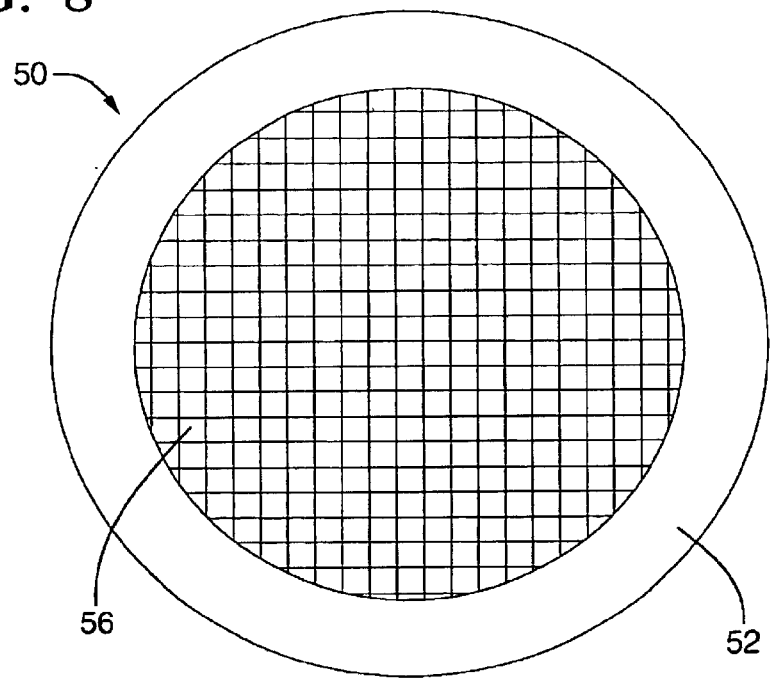
FIG. 8 is an end view of the catalyst substrate of FIG. 7.

Referring now to the exemplary embodiments shown in FIGS. 7 and 8, catalyst substrate 50 can preferably include both a first lip 52 located concentrically about a first end 54 of catalyst substrate 50, surrounding an exhaust gas inlet 56, and a second lip 58 located concentrically around a second end 60 of catalyst substrate 50 and surrounding an exhaust gas outlet 62, with both first lip 52 and second lip 58 either continuous or segmented. Catalyst substrate 50 can also preferably include an outer surface 64 comprising an area having a plurality of alternating depressions 59 and continuous or segmented ridges 51 disposed concentrically and circumferentially about the catalyst substrate 50, between first and second lips 52, 58.

Referring now to FIGS. 9–22, located between catalyst substrate 10, 30, 50 and a catalytic converter shell 72, 78, is a mat support material 70 that insulates shell 72, 78 from both high exhaust gas temperatures and the exothermic catalytic reaction occurring within the catalyst substrate 10, 30, 50. The mat support material 70, which enhances the structural integrity of catalyst substrate 10, 30, 50 by applying compressive radial forces about it, reducing its axial movement, and retaining it in place, is concentrically disposed around the catalyst substrate 10, 30, 50 to form a mat support material/catalyst substrate subassembly. Mat support material 70 can comprise an insulating material such as ceramic fibers, vermiculite, and the like, or other combinations comprising at least one of the foregoing and other conventional materials such as an organic binder. Mat support material 70 can either be a simple non-intumescent material, or an intumescent material, e.g., one which contains a vermiculite component that expands with heating to maintain firm compression when the shell expands outward from the catalyst substrate, as well as materials which include a combination of both. Typical non-intumescent materials include ceramic materials, and other conventional materials such as an organic binder and the like, or combinations comprising at least one of the foregoing, such as those sold under the trademarks "NEXTEL" and "SAFFIL" by the "3M" Company, Minneapolis, Minn. or those sold under the trademark, "FIBERFRAX" and "CC-MAX" by the Unifrax Co., Niagara Falls, N.Y., and the like. Intumescent materials include ceramic materials such as those sold under the trademark "INTERAM" by the "3M" Company, Minneapolis, Minn., as well as those intumescents which are also sold under the aforementioned "FIBERFRAX" trademark, as well as combinations comprising at least one of the foregoing and others.

Catalyst substrate 10, 30, 50 is concentrically disposed within shell 72 having at least one opening 74, or alternatively, a shell 78 having at least one opening 80. The choice of material for shell 72, depends upon the type of exhaust gas, the maximum temperature reached by the catalyst substrate, the maximum temperature of the exhaust gas, and the like. Suitable materials for shell 72, can comprise any material that is capable of resisting under-car salt, temperature and corrosion. Typically, ferrous materials are employed such as ferritic stainless steels. Ferrous materials, and the like, include the 400-Series such as SS-409, SS-439, and SS-441, with grade SS-409 generally preferred.

Referring generally to FIGS. 9–14, the difference between shell 72 and shell 78 can be found in their respective structures. Shell 78 can include a conical shaped exhaust gas intake area 73, an exhaust gas outlet area 75, and a containment area 77 disposed therebetween. Conical shaped exhaust gas intake area 73 can be an outer endcone assembly as opposed to the complete endcone assembly utilized with shell 72. An end plate or exhaust manifold rather than another end cone assembly can optionally define gas exhaust outlet area 75 of shell 78.

In addition, a pair of annular shoulders 81, 83 can further define containment area 77 of shell 78. Annular shoulder 81 can preferably be disposed concentrically about shell 78 between conical shaped exhaust gas intake area 73 and containment area 77. Annular shoulder 83 can preferably be disposed concentrically about shell 78 between exhaust gas outlet area 75 and containment area 77. Annular shoulders 81, 83 can preferably be formed when shell 78 is sized to fit about the catalyst substrate/mat support material subassembly disposed therein (e.g., with a crimping device), or when shell 78 is manufactured using a stamping die having the features of annular shoulders 81, 83 included, such as, e.g. a stamping die for a clam shell or half shell designs.

Annular shoulders 81, 83 can preferably abut the outermost edges of mat support material 70. The engagement of mat support material 70 with shoulders 81, 83 further retains the mat support material stationary against the catalyst substrate 10, 30, 50, again increasing compressive forces and thereby further inhibiting axial movement. As a result, annular shoulders 81, 83 further reduce and prevent the axial movement of the catalyst substrate 10, 30, 50 during assembly and operation of the catalytic converter.

Production of the catalytic converter comprises forming the subassembly and disposing the subassembly in the shell. Typically, the mat support material/catalyst substrate subassembly can be inserted into shell 72 or 78 using a variety of methods. The methods are chosen based upon the type of shell, i.e. clamshell, tubular, spinform, and others, that is being utilized. The subassembly can be placed in a stuffing cone, for example. The stuffing cone is a device that compresses mat support material 70 concentrically about catalyst substrate 10, 30, or 50 using a ramming component. The ram stuffs the compressed subassembly into shell 72 or 78. In the alternative, the subassembly can also be concentrically disposed within shell 72 or 78 by several canning methods, such as, for example, the sized-to-dimension method, stuffed method, tourniquet wrap method, clamshell style method, and the like. Furthermore, each opening of shell 72 in any embodiment, can be fitted with an end cone, end plate, mat protection ring, exhaust manifold, or the like, as well as a combination including at least one of the foregoing, as is appropriate with the design and use.

Figure 9:
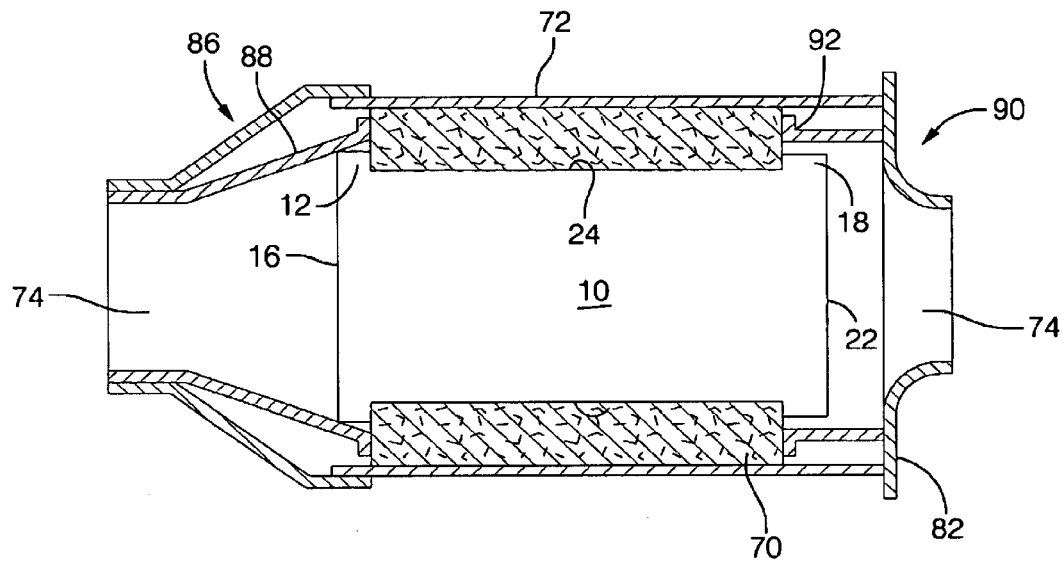
FIG. 9 is a cross-sectional view of an exemplary embodiment of an internally insulated catalytic converter of the present invention utilizing the catalyst substrate of FIG. 3.
Figure 10:
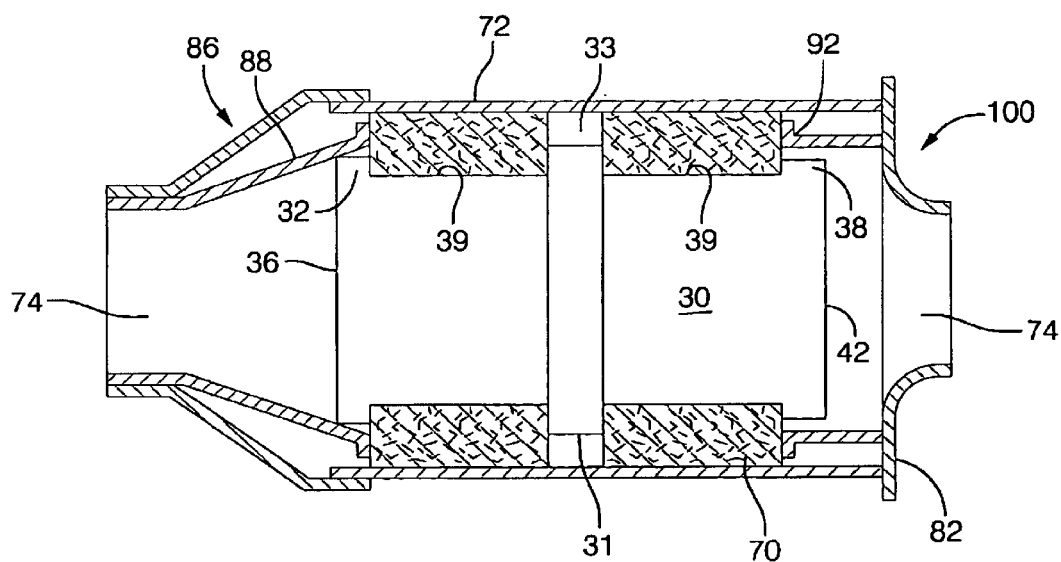
FIG. 10 is a cross-sectional view of another exemplary embodiment of an internally insulated catalytic converter of the present invention utilizing the catalyst substrate of FIG. 5.
Figure 11:
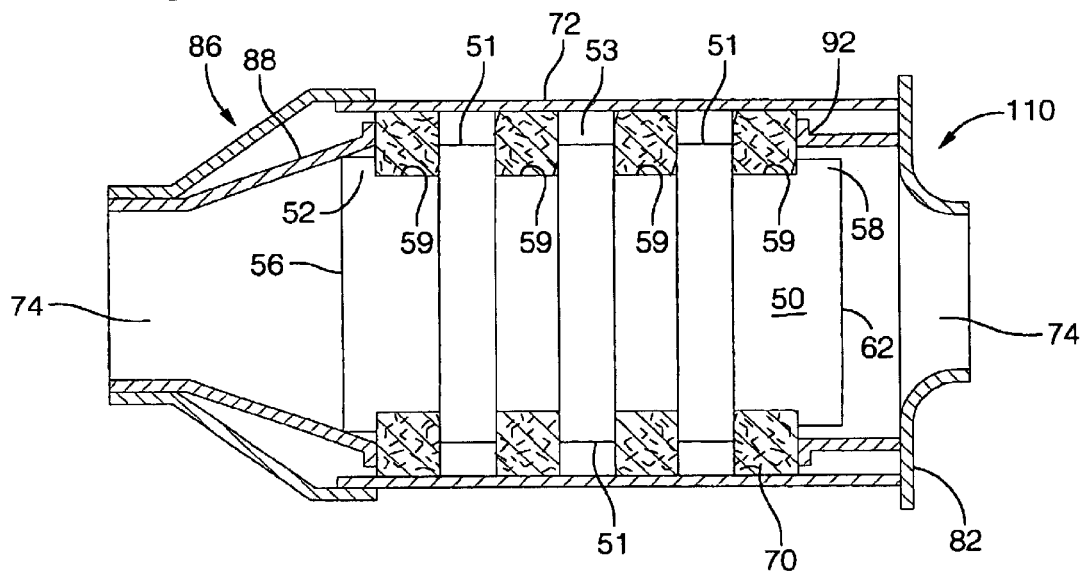
FIG. 11 is a cross-sectional view of yet another exemplary embodiment of an internally insulated catalytic converter of the present invention utilizing the catalyst substrate of FIG. 7.

FIGS. 9–11 show exemplary embodiments of internally insulated catalytic converter designs 90, 100, 110. Internally insulated catalytic converters are equipped with end cone assemblies 86 having an inner end cone 88 and/or end plate 82 connected to mat protection ring 92, which provide additional insulative properties beyond those provided by only utilizing mat support material. Mat protection ring 92 can be a formed metal hoop sized to a desired geometry required to substantially fit concentrically about catalyst substrate 10, 30, 50 and, preferably, within mat support material 70. Mat protection ring 92 can be inserted concentrically within shell 72, until fitting concentrically about catalyst substrate 10, 30, 50, between catalyst substrate 10, 30, 50 and mat support material 70. Optionally, mat protection ring 92 can penetrate the mat support material 70 a certain distance.

Internally insulated catalytic converters 90, 100, 120 can preferably include catalyst substrates 10, 30, 50, respectively, mat support material 70, and shell 72. In catalytic converter 90 (See FIG. 9), mat support material 70 can be disposed concentrically about catalyst substrate 10, and within the depressed outer surface 24. The outermost edges of mat support material 70 can abut the inner surfaces of both first lip 12 and second lip 18. In catalytic converter 100, and 110, two or more pieces of mat support material 70 can be disposed within depressions 39, 59, and concentrically wrapped about catalyst substrate 30, 50. The edges of mat support material 70 can optionally abut the inner surfaces of both first lip 32, 52, second lip 38, 58, and/or structural features. In addition, an annular gap 33, 53 can coincide with the structural features, and be defined by the innermost edges of mat support material 70, shell 72, and ridge 31, 51. Alternatively, the mat support material 70 can be disposed from first lip 32, 52 to second lip 38, 58, across the structural features of the catalyst substrate.

Figure 15:
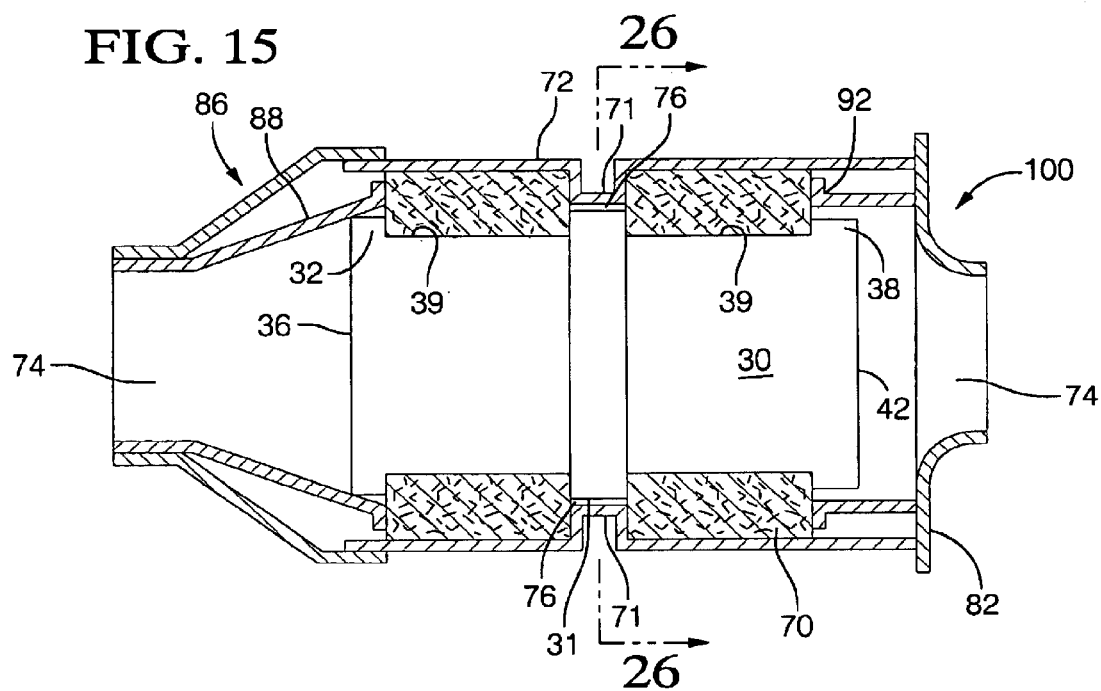
FIG. 15 is a cross-sectional view of an alternative embodiment of the internally insulated catalytic converter of FIG. 10.
Figure 17:
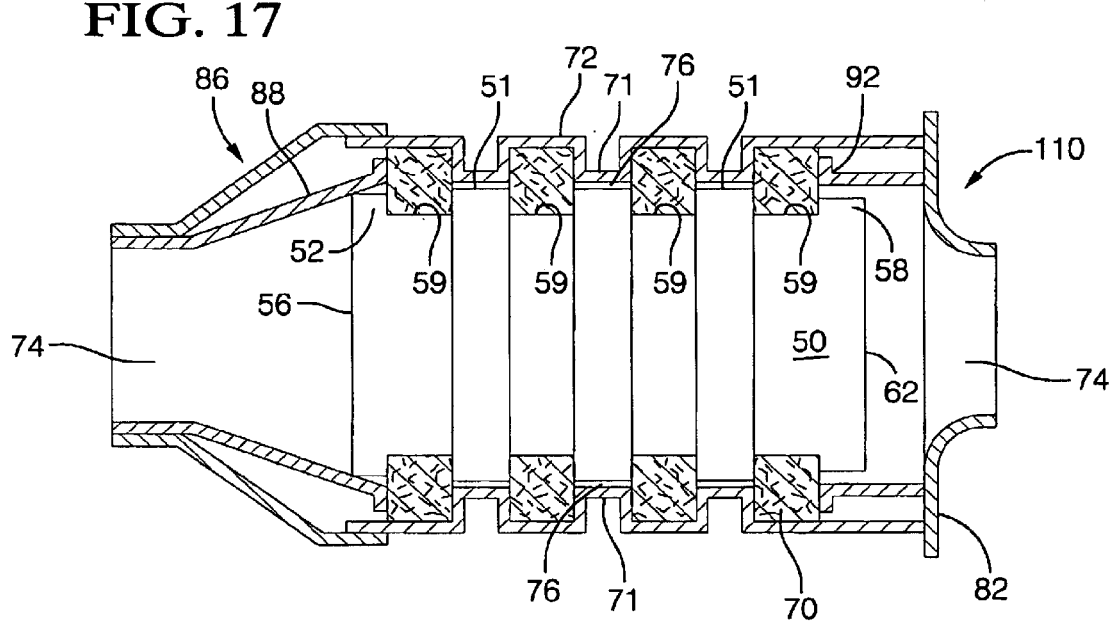
FIG. 17 is a cross-sectional view of an alternative embodiment of the internally insulated catalytic converter of FIG. 11.

An alternative embodiment of the internally insulated catalytic converters 100, 110 can include shell 72 having one or more concentrically depressed annular areas 71 corresponding to one or more structural features, such as ridges 51, on catalyst substrates 30, 50 (See FIGS. 15, 17). A sizing operation can be employed to form the one or more depressed annular areas 71 about shell 72. The sizing operation optionally creates annular gap(s) 76 that can be defined between the exterior surface of the ridges 51, the interior surface of the shell, and the exposed interior edges of the mat support material 70 abutting the ridge(s). The depressed annular area 71, which can provide additional structural integrity to shell 72, preferably coincides with the ridges 51 so that the mat support material 70 maintains a uniform local mount density along the outer surface of the catalyst substrate. The depressed annular area 71 can provide yet another surface for the mat support material 70 to abut against and to increase compressive forces, enhancing the mat support material 70's ability to reduce and prevent the axial movement of the catalyst substrate 10, 30, 50 during assembly and operation of the catalytic converter. When segmented annular ridges are utilized, the depressed annular area 71 can become an intermittently depressed annular area 71'. The intermittent depressions preferably coincide with segmented structural ridges 31', or, alternatively, can be disposed between segmented structural ridges 31', (See FIG. 26.)

Figure 16:
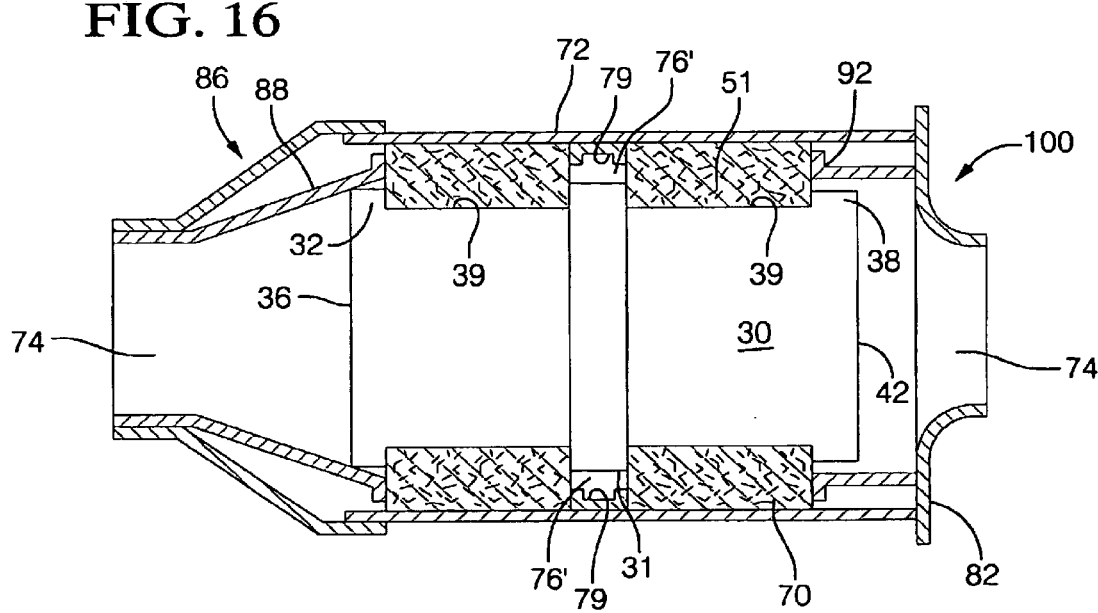
FIG. 16 is a cross-sectional view of another alternative embodiment of the internally insulated catalytic converter of FIG. 10.
Figure 18:
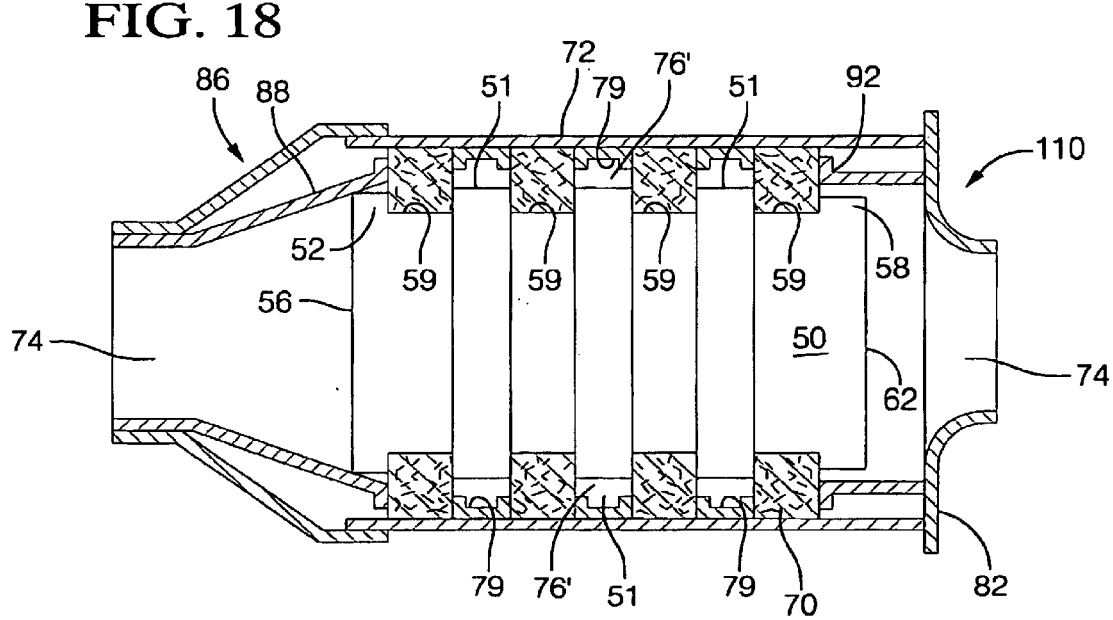
FIG. 18 is a cross-sectional view of another alternative embodiment of the internally insulated catalytic converter of FIG. 11.

Yet another alternative embodiment of the internally insulated catalytic converters 100, 110 can include shell 72 having one or more U-shaped rings 79 welded or otherwise attached to the interior surface of shell 72, and disposed in a facing relationship with one or more structural features on catalyst substrates 30, 50 (See FIGS. 16, 18). U-shaped rings 79 can be tack welded at the curvature of the "U" to the interior surface of shell 72. Each side of U-shaped ring 79 can contact the exposed interior edges of mat support material 70, which also abuts one or more structural features. An annular gap 76' can be defined by the exterior surface of the ridge(s), the interior surface of U-shaped ring 79, and the exposed interior edges of the mat support material 70 abutting, for example, the ridges 51.

Figure 12:
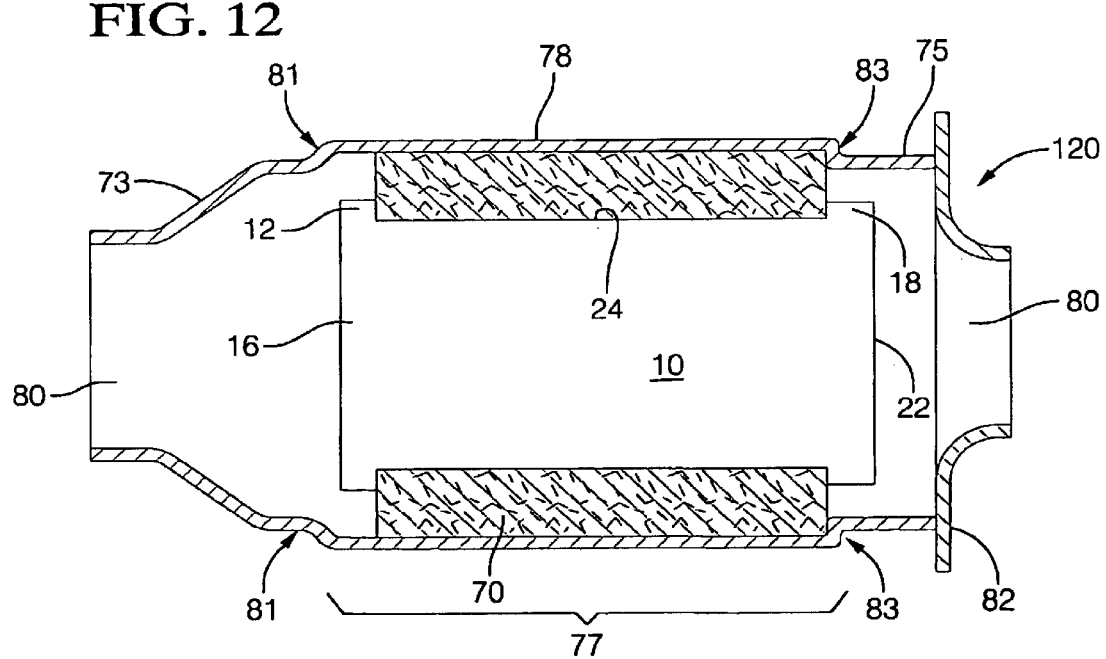
FIG. 12 is a cross-sectional view of an exemplary embodiment of a non-internally insulated catalytic converter of the present invention utilizing the catalyst substrate of FIG. 3.
Figure 13:
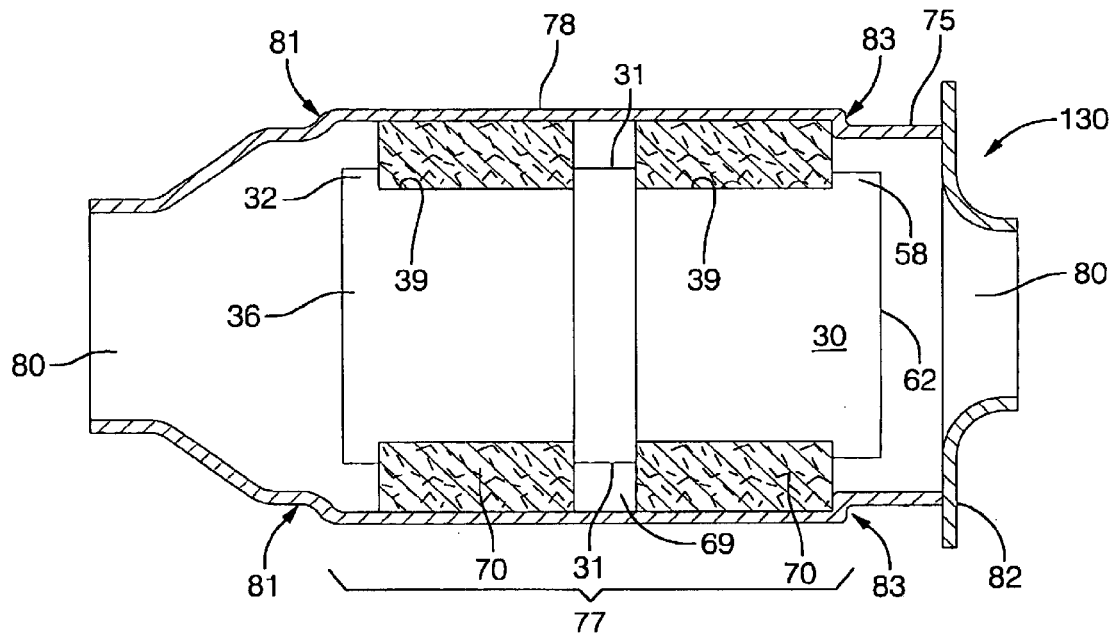
FIG. 13 is a cross-sectional view of another exemplary embodiment of a non-internally insulated catalytic converter of the present invention utilizing the catalyst substrate of FIG. 5.
Figure 14:
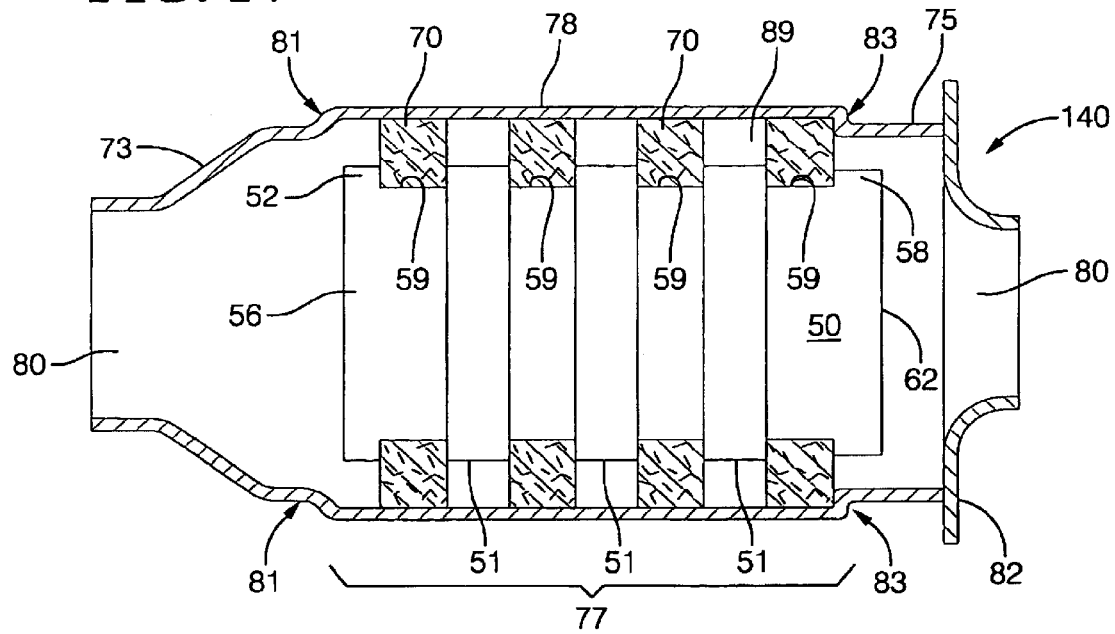
FIG. 14 is a cross-sectional view of yet another exemplary embodiment of a non-internally insulated catalytic converter of the present invention utilizing the catalyst substrate of FIG. 7.

FIGS. 12–14 depict exemplary embodiments of non-internally insulated catalytic converter designs 120, 130, 140. Non-internally insulated catalytic converters differ from internally insulated catalytic converters in that non-internally insulated catalytic converters are equipped with neither inner end cone assemblies nor a mat protection ring. Consequently, non-internally insulated catalytic converters 120, 130, 140 can preferably include catalyst substrates 10, 30, 50, respectively, mat support material 70, and shell 78. In catalytic converter 120, mat support material 70 can be disposed concentrically about catalyst substrate 10, and within depressed outer surface 24. The outermost edges of mat support material 70 can abut the inner surfaces of both first lip 12 and second lip 18.

In catalytic converter 130 (See FIG. 13), two or more pieces of mat support material 70 can be disposed concentrically about catalyst substrate 30, and within depressions 39. The outermost edges of mat support material 70 can abut the inner surfaces of both first lip 32 and second lip 38, while the innermost edges abut the structural feature 31. In addition, an annular gap 69 can be defined by the innermost edges of mat support material 70, shell 78, and structural feature 31 of catalyst substrate 30, and concentrically coincide with the structural feature 31. Whereas in catalytic converter 140, two or more pieces of mat support material 70 can be disposed within each depression 59, and concentrically about catalyst substrate 50. The outermost edges of mat support material 70 can abut the inner surfaces of both first lip 52 and second lip 58, while the innermost edge can abut the ridges 51. An annular gap 89 can be defined by the innermost edges of mat support material 70, shell 78, and ridges 51 of catalyst substrate 50, and concentrically coincide with each ridge 51.

Figure 19:
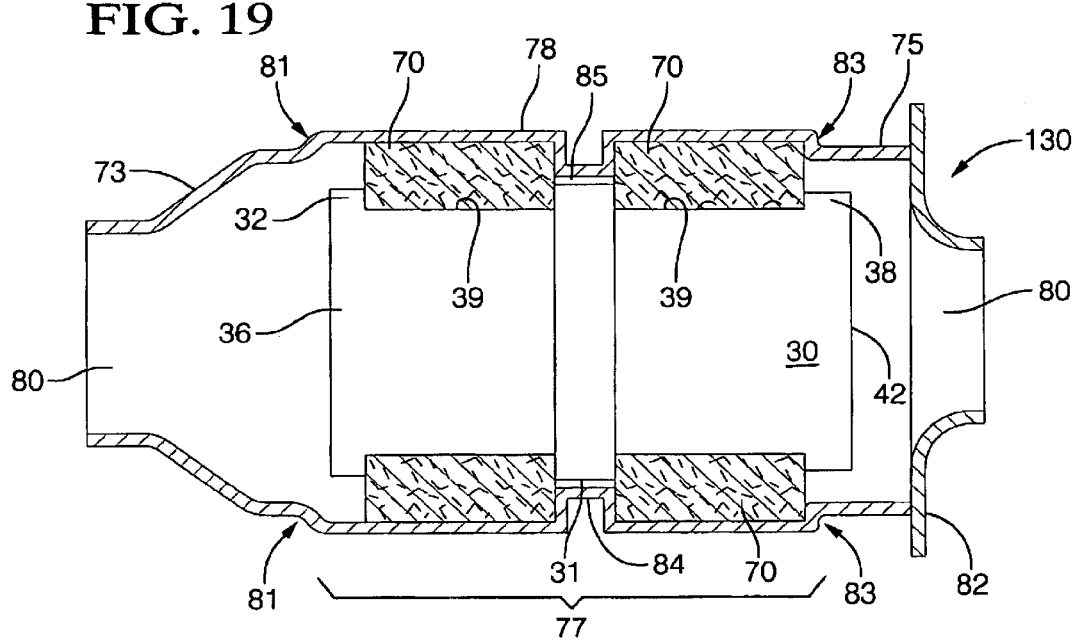
FIG. 19 is a cross-sectional view of an alternative embodiment of the non-internally insulated catalytic converter of FIG. 13.
Figure 21:
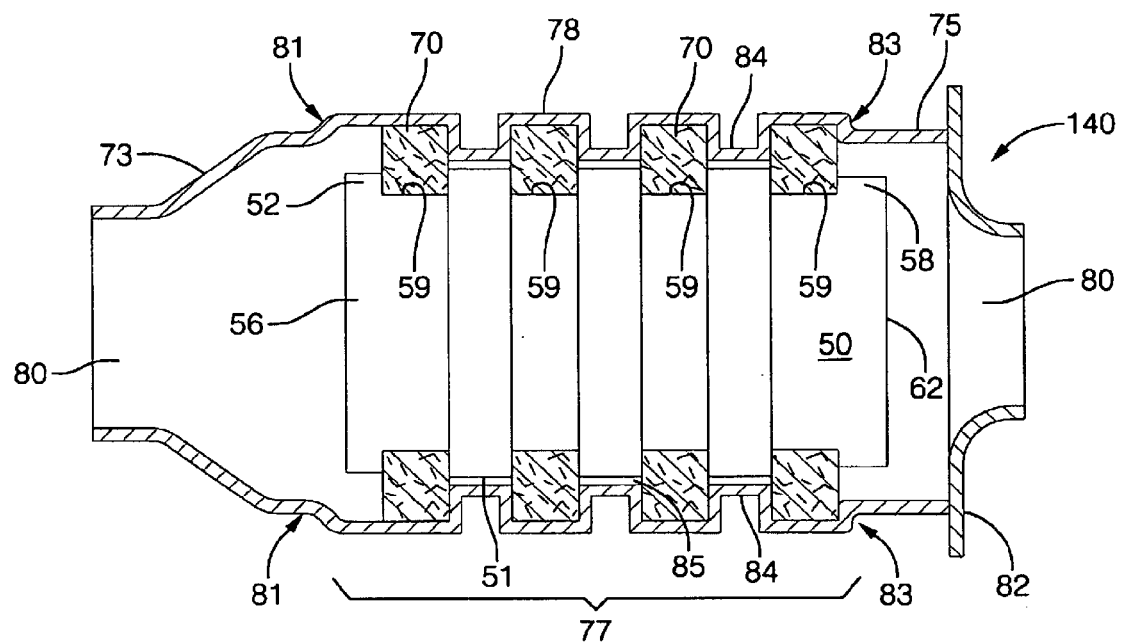
FIG. 21 is a cross-sectional view of an alternative embodiment of the non-internally insulated catalytic converter of FIG. 14.

In addition, an alternative embodiment of the non-internally insulated catalytic converters 130, 140 can include shell 78 having one or more concentrically formed depressed annular area(s) 84 corresponding to one or more ridges on catalyst substrate 30, 50 (See FIGS. 19, 21). An annular gap 85 can be defined by the exterior surface of the ridge(s), the interior surface of the shell, and the exposed interior edges of the mat support material 70 abutting the ridge(s). Depressed annular areas 84 can impart the same structural benefits to shell 78 as depressed annular area 71 does to shell 72 of catalytic converters 100, 110. Alternatively, catalyst substrate 50 having segmented ridge 31', for example, can also be employed in catalytic converters 130, 140. When segmented annular ridges are utilized, the depressed annular area 84' can become similar to the intermittently depressed annular area 71'. The intermittent depressions can also coincide with ridges 31', or, alternatively, can be disposed between ridges 31', like the intermittent depressions shown in FIG. 26.

Figure 20:
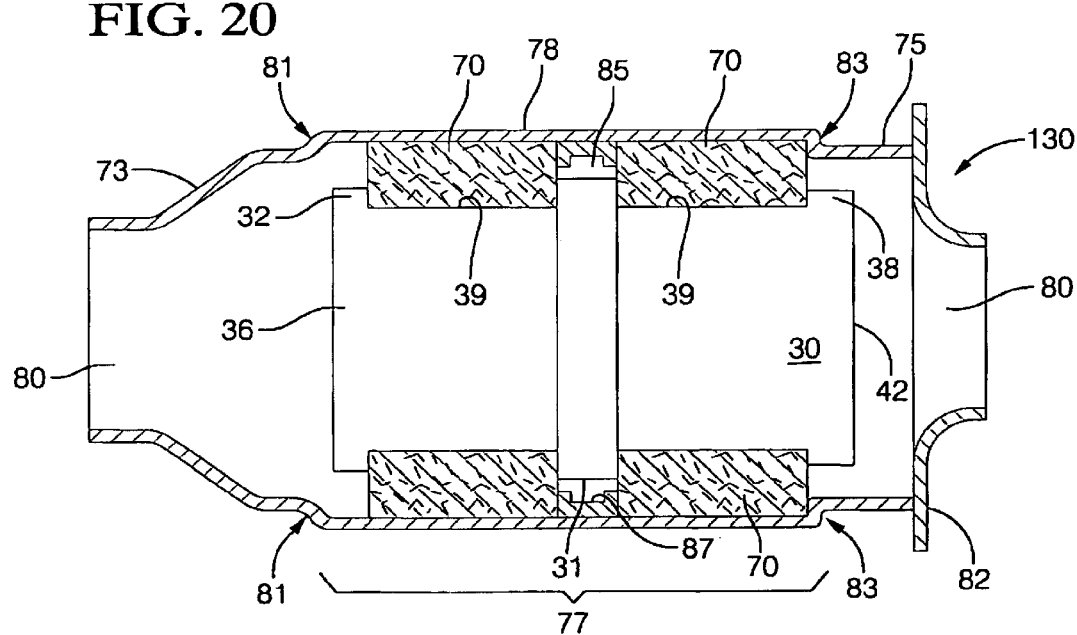
FIG. 20 is a cross-sectional view of another alternative embodiment of the non-internally insulated catalytic converter of FIG. 13.
Figure 22:
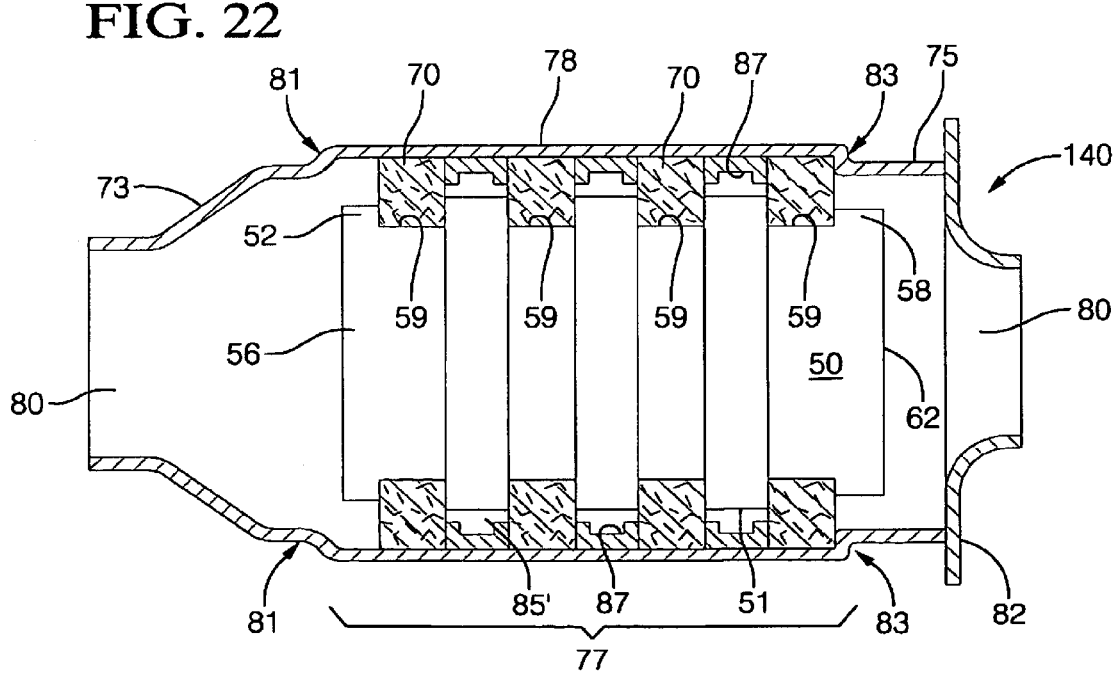
FIG. 22 is a cross-sectional view of another alternative embodiment of the non-internally insulated catalytic converter of FIG. 14.

Similar to the internally insulated embodiments illustrated in FIGS. 16 and 18, yet another alternative embodiment of the non-internally insulated catalytic converters 130, 140 can include shell 78 having one or more U-shaped rings 87 welded onto the interior surface of shell 78, and disposed in a facing spaced relationship with one or more ridges on catalyst substrates 30 and 50 (See FIGS. 20, 22). The ring 87 can form annular gap 85', while each side of U-shaped ring 87 can contact the exposed interior edges of mat support material 70, which also abuts one or more ridges.

Figure 23:
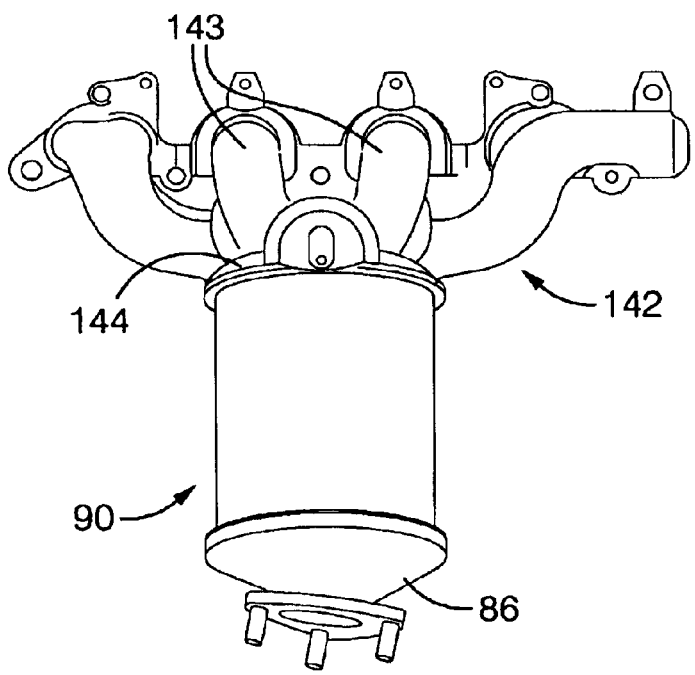
FIG. 23 is a front view of an exhaust manifold assembly mounted to a catalytic converter of the present invention.
Figure 24:
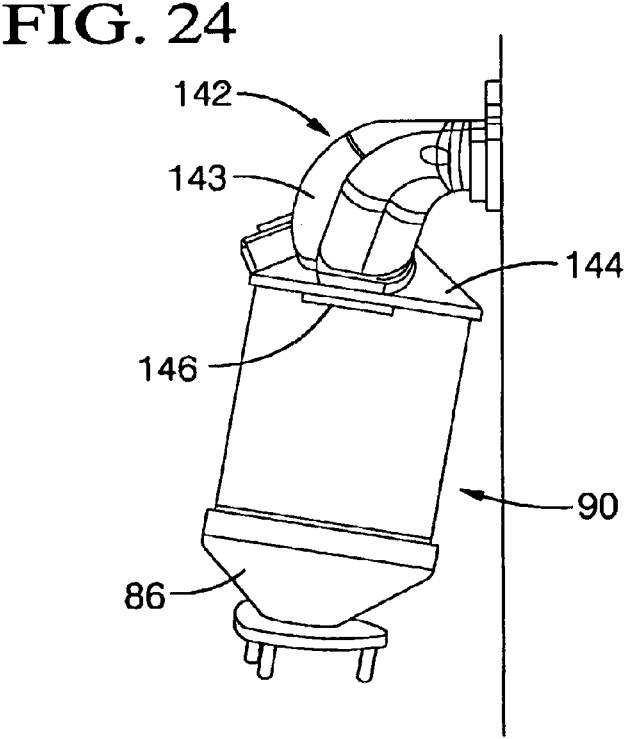
FIG. 24 is a side view of the exhaust manifold assembly of FIG. 23 mounted to a catalytic converter of the present invention.

Referring to FIGS. 23–24, the exemplary embodiments of the catalytic converters shown in FIGS. 9–22 can be employed in exhaust manifold/catalytic converter designs. An exhaust manifold 142, as shown in a front view in FIG. 23 and a side view in FIG. 24, is designed to collect exhaust gases exiting the cylinders of a mobile vehicle's engine. Exhaust manifold 142 comprises a collection of pipes 143, or runners, whose number corresponds with the number of cylinders in the engine. Upon exiting the engine compartment, the pipes 143 are directed to a single collection area leading to a catalytic converter, e.g., catalytic converter 90 fitted with an endcone 86, and then to an exhaust pipe (not shown). An exhaust manifold cover 144 having a plurality of manifold receiving openings 146 can place exhaust manifold 142 in direct fluid communication with any of the catalytic converters shown in FIGS. 9–22, so that the catalytic converter can catalytically treat the exhaust gas stream.

The exemplary embodiments disclosed herein provide several advantages over current catalytic converter designs. Typical catalytic converter designs rely solely upon the mat support material exerting forces against the catalyst substrate to inhibit axial movement. In the present design, frictional forces are combined with compressive forces to better restrict axial movement.

Figure 2:
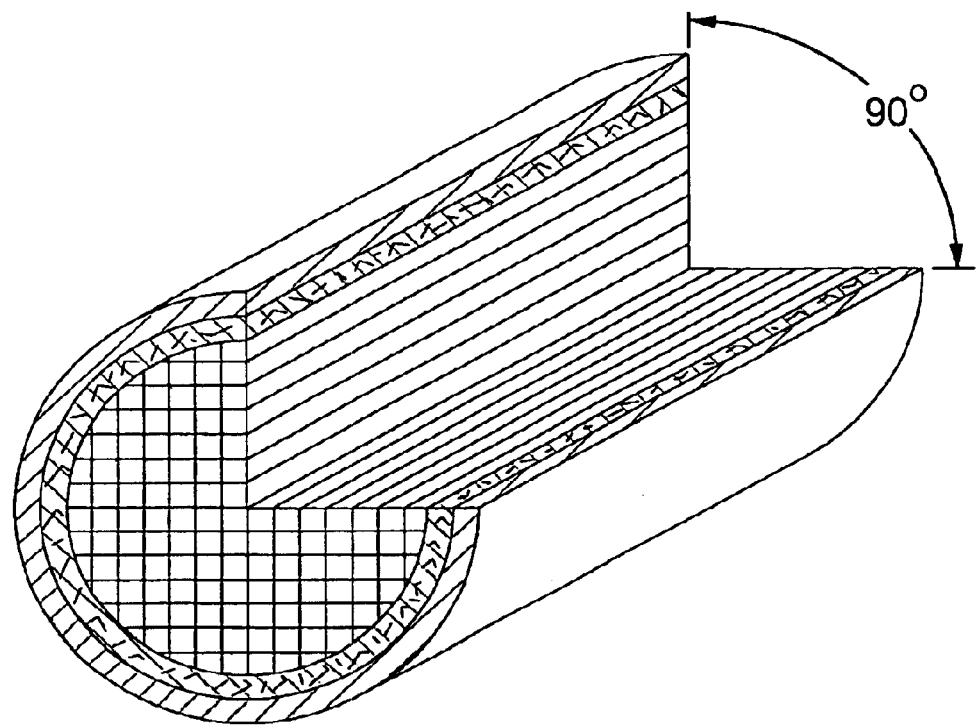
FIG. 2 is a perspective, cut-out view of the catalytic converter of FIG. 1 (without the end cone assemblies)

Typically, in a conventional catalytic converter design, the catalyst substrate outer surface and the shell inner surface form straight cylinders when viewed in the flow direction, through the catalyst substrate (see FIGS. 1, 2). The cylinders, when viewed in the flow direction, may have a circular, oval, or trapezoidal shape, etc., but generally do not change shape along the length of the catalyst substrate. In contrast, the systems disclosed herein incorporate catalyst substrate and/or shell designs having features for reducing the axial movement of the catalyst substrate during assembly and operation of the catalytic converter. The catalyst substrate and/or shell features, e.g., lips, ridge(s), annular area(s), U-shaped ring(s), as well as combinations comprising at least one of the foregoing, can be implemented during standard manufacturing and assembly steps of a catalytic converter. Likewise, since these features can be implemented with ease, the catalyst substrate and/or shell features can be incorporated into numerous catalytic converter applications such as, for example, diesel engine and spark ignition environments.

Also, the total number of components typically utilized in conventional catalytic converters can actually be reduced while still reducing the axial movement of the catalyst substrate. Reducing the number of components lightens the catalytic converter's weight, which positively impacts the overall design and efficiency of the mobile vehicle. Since the lips inhibit exhaust gas exposure to the mat support material, non-internally insulated catalytic converter designs can be employed which eliminate the need for inner end cones and/or mat protection rings. They employ end cone assembly(ies) with a single outer cone and/or end plate(s). Removing the inner end cones from conventional catalytic converter designs not only reduces the number of components but also reduces the cost to manufacture the catalytic converter.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A catalytic converter comprising:
   a catalyst substrate comprising a catalyst, and having a first lip concentrically disposed about a first end of said catalyst substrate, a second lip concentrically disposed about a second end of said catalyst substrate, at least one ridge therebetween, and an outer surface such that the ridge is spaced apart form the first lip by said outer surface and spaced apart from the second lip by said outer surface, said outer surface having an outer surface diameter less than the outer diameter of the ridge;
   a shell having an opening, and concentrically disposed around said catalyst substrate, said shell comprising a U-shaped attachment opposite the ridge; and
   a first mat support material disposed about the outer surface between said ridge and the first lip, and a second mat support disposed about said outer surface between said ridge and the second lip and spaced apart from the first mat support material by a gap between said ridge and said shell, whereby the U-shaped attachment is disposed with said gap.

2. A catalytic converter recited in claim 1, wherein said first lip and said second lip are continuous annular lips.

3. A catalytic converter recited in claim 1, wherein said first lip and said second lip are segmented annular lips.

4. A catalytic converter recited in claim 1, wherein said ridge comprises a continuous annular geometry.

5. A catalytic converter recited in claim 1, wherein said ridge comprises a segmented annular geometry.

6. A catalytic converter recited in claim 1, wherein said ridge has a diameter equal to or smaller than the first lip diameter.

7. A catalytic converter recited in claim 1, wherein sides of said U-shaped attachment contact edges of said first mat support material and said second mat support material.

8. A catalytic converter recited in claim 1, wherein said shell further comprises a first annular shoulder disposed concentrically and circumferentially about said shell adjacent said first lip.

9. A catalytic converter recited in claim 8, wherein said shell further comprises a second annular shoulder disposed concentrically and circumferentially about said shell adjacent said second lip.

10. A catalytic converter recited in claim 1, further comprising a mat protection ring concentrically disposed within said shell, concentrically around an end of said catalyst substrate.

11. A catalytic converter recited in claim 1, further comprising an endcone, endplate, or exhaust manifold, disposed at one or both ends of said shell.

12. A catalytic converter comprising:
   a catalyst substrate comprising a catalyst, and having a first lip concentrically disposed about a first end of said catalyst substrate, a second lip concentrically disposed about a second end of said catalyst substrate, at least one ridge therebetween, and an outer surface such that the ridge is spaced apart form the first lip by said outer surface and spaced apart from the second lip by said outer surface, said outer surface having an outer surface diameter less than the outer diameter of the ridge:
   a shell having an opening, and concentrically disposed around said catalyst substrate: and
   a first mat support material disposed about the outer surface between said ridge and the first lip, and a second mat support disposed about said outer surface between said ridge and the second lip and spaced apart from the first mat support material by a gap between said ridge and said shell
   wherein said ridge is intermittent and said shell further comprises intermittent depressions concentrically and circumferentially disposed about said shell coinciding with said ridge.

* * * * *